INVENTOR
JOHN MASSEY by: Wolfe, Hubbard, Voit & Osann
ATTYS.

United States Patent Office 3,541,857
Patented Nov. 24, 1970

3,541,857
**COMPENSATED RESISTANCE BRIDGE-TYPE
ELECTRICAL THERMOMETER**
John Massey, 517 East Building, Hunting Towers,
Mount Vernon Blvd., Alexandria, Va. 22314
Filed Nov. 27, 1968, Ser. No. 779,558
Int. Cl. G01k 7/24
U.S. Cl. 73—362             12 Claims

ABSTRACT OF THE DISCLOSURE

A resistance bridge-type electrical thermometer including a temperature-sensing resistor having a nonlinear temperature resistance characteristic in one arm of the bridge, and a compensating resistor made of the same material as the temperature-sensing resistor in another arm of the bridge. Both the temperature-sensing resistor and the compensating resistor are contained in a single sensor probe, so that two resistors are always exposed to the same temperature. The compensating resistor is connected in the bridge in such a manner that it compensates for the nonlinear temperature-resistance characteristic of the temperature-sensing resistor so that the change of null adjustment of the bridge for a given temperature change remains substantially constant over a preselected temperature range.

---

The present invention relates generally to bridge-type electrical thermometers and, more particularly, to an improved resistance bridge-type thermometer which provides a linear relationship between the sensor temperature and null adjustment.

Heretofore, it has been recognized that the null adjustment of many bridge-type thermometers is a nonlinear function of the sensed temperature because the resistance change for each degree of temperature change varies over the range of temperature being sensed, i.e., the resistance-temperature coefficient is not linear. A number of different solutions have been proposed to compensate for this nonlinearity, but all the solutions suggested thus far have had certain technical and/or economic shortcomings.

It is, therefore, a primary object of the present invention to provide an improved resistance bridge-type thermometer which provides a highly accurate and reliable output by means of an improved and yet economical circuit arrangement.

It is another object of the present invention to provide an improved bridge-type electrical thermometer of the foregoing type which provides a substantially linear resistance-temperature coefficient over a relatively wide temperature range.

Still another object of the invention is to provide such an improved bridge-type thermometer which facilitates optimization of the bridge parameters to minimize the deviations from ideal linearity and thereby provide relatively precise temperature measurements.

A further object of the invention is to provide an improved bridge-type electrical thermometer of the type described above which is readily adaptable to control applications as well as temperature sensing applications.

Yet another object of the invention is to provide such an improved bridge-type electrical thermometer which can be efficiently manufactured at a relatively low cost.

Other objects and advantages of the invention will become apparent from the following detailed description and the accompanying drawings, in which.

Figure 1:
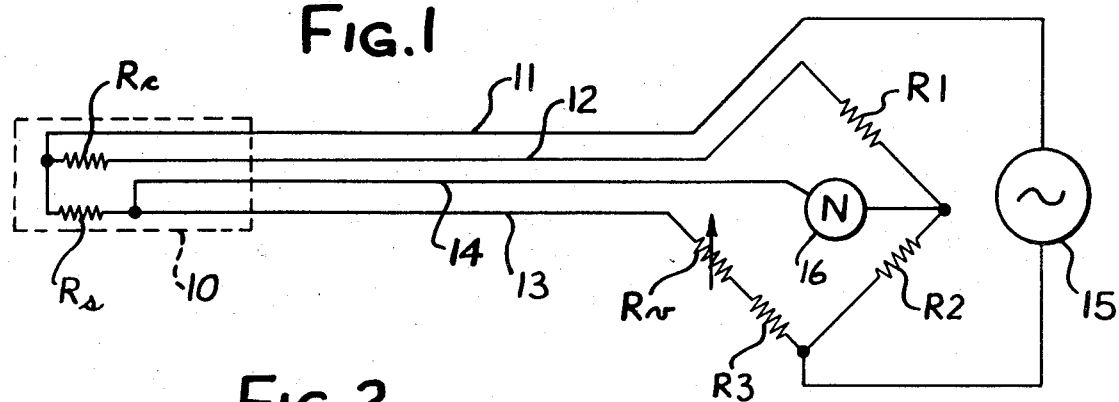
FIG. 1 is a schematic circuit diagram of a bridge circuit for use in an electrical thermometer embodying the present invention and using a temperature-sensing element made of nickel.

While the invention is susceptible of various modifications and alternative forms, certain specific embodiments thereof have been shown by way of example in the drawings which will be described in detail herein. It should be understood, however, that it is not intended to limit the invention to the particular forms disclosed but, on the contrary, the intention is to cover all modifications, equivalents, and alternatives falling within the spirit and scope of the invention as expressed in the appended claims.

Turning now to the drawings, FIG. 1 illustrates an electrical resistance bridge in which three of the four bridge arms contain fixed resistors R1, R2, and R3, respectively. The fourth arm of the bridge comprises a temperature responsive sensing resistor $Rs$ which is contained within a sensor probe indicated schematically at 10, with the sensing resistor $Rs$ being connected to the main portion of the bridge circuit by means of a plurality of leads 11, 12, 13 and 14. As will be apparent to those familiar with the art of electrical bridges, the illustrative bridge is balanced or "at null" when the cross products of the bridge resistances are equal, i.e., when the product of the resistances of the arms containing R1 and R3 is equal to the product of the resistances of the arms containing R2 and $Rs$. To determine when the bridge is balanced, an A-C power supply such as a 1000-c.p.s. oscillator 15 is connected across the bridge in one direction, and a null detector such as a synchronous demodulator 16 is connected across the bridge in the other direction. The bridge is initially adjusted to be in balance, and when it is subsequently unbalanced by a change in the resistance of $Rs$ due to a change in the sensed temperature, a linear variable resistor $Rv$ connected in series with resistor R3 is adjusted until the null detector 16 indicates that the bridge has been restored to balance. By recording the value of resistor $Rv$ required to balance or null the bridge at a number of sensor temperatures, during calibration, the sensor temperature can be accurately determined (in use) by consulting the recorded data.

It will be understood that the linear variable resistor $Rv$ may be continuously variable, as in the case of a potentiometer, or variable in increments, as in the case of a decade resistance box for example.

As mentioned previously, one of the problems that has been encountered with electrical thermometers of the type described thus far has been the nonlinear nature of the resistance-temperature coefficient thereof. That is, the slope of the $Rv/T$ curve is not constant over the entire temperature range of interest. Consequently, a given adjustment of $Rv$ to restore the bridge to balance cannot be used to indicate temperature directly, and thus it is necessary to correlate each nulling adjustment of $Rv$ with previously prepared tables, charts or the like in order to accurately determine the temperature. Many other proposals have been made for compensating for the nonlinearity of the resistance-temperature coefficient automatically, but all of these proposals have certain teuhnical and/or economic shortcomings.

In order to illustrate the non-linear nature of the bridge arrangement described thus far, i.e., the bridge arrangement of FIG. 1 without the resistor $Rc$ to be discussed below, assume that the tempertaure range of interest is from $-40°$ F. ($t_1$) to $260°$ F. ($t_2$) and R2 is 5900 ohms. At null:

at $t_1$, $Rv_1 = o$, $Rs_1 R2 = R1 R3$ at $t_2$, $Rv_2 = 3000$ ohms, $Rs_2 R2 = R1(R3 + Rv_2)$ $$\frac{Rs_1}{Rs_2} = \frac{R3}{R3 + Rv_2}$$

solving for R3 and R1:

$$R3 = \frac{(Rs_1) Rv_2}{Rs_2 - Rs_1} = 3982.756 \text{ ohms}$$

$$R1 = \frac{(Rs_1 \cdot R2) Rs_2 - Rs_1}{Rv_2(Rs_1)} = 358.488 \text{ ohms}$$

Using the above values, the resistance values in the bridge circuit of FIG. 1 without resistor Rc at $30°$ F. temperature intervals over the range of $=40°$ F. to $260°$ F. are as follows:

| Temp. | Rs | Rv+R3 | Increment | Error ° F., deviation from linearity |
|---|---|---|---|---|
| -40 | 242.670 | 3,982.758 | | 0.0000 |
| -10 | 257.889 | 4,232.535 | 249.777 | -5.02 |
| +20 | 273.696 | 4,491.963 | 259.428 | -9.08 |
| +50 | 290.124 | 4,761.584 | 269.621 | -12.12 |
| +80 | 307.200 | 5,041.839 | 280.255 | -14.10 |
| +110 | 325.020 | 5,334.305 | 292.466 | -14.85 |
| +140 | 343.560 | 5,638.588 | 304.283 | -14.42 |
| +170 | 362.850 | 5,955.1802 | 316.592 | -12.76 |
| +200 | 382.920 | 6,284.574 | 329.394 | -9.82 |
| +230 | 403.770 | 6,626.769 | 342.195 | -5.60 |
| +260 | 425.460 | 6,982.750 | 355.981 | -0.0008 |

In accordance with the present invention, a compensating means including a second temperature-sensing means is included in the sensor probe for producing a second nonlinear electrical characteristic representing the sensed temperature with the ratio of the second characteristic to the characteristic of the primary temperature-sensing means being a constant, and means are operatively connected to the two temperature-sensing means to multiply or divide the first characteristic by the second characteristic to produce a linear electrical characteristic representing the sensed temperature. Thus, in the illustrative embodiment of FIG. 1, a compensating resistor having a nonlinear temperature-resistance characteristic similar to that of the temperature-sensing resistor is contained in the sensor probe along with the temperature-sensing resistor, and this compensating resistor is connected in series with one of the fixed resistors in the bridge to compensate for the nonlinear temperature-resistance characteristic of the temperature-sensing resistor so that the nulling adjustment of the bridge for a given temperature change remains substantially constant over the entire preselected temperature range. More particularly, a compensating resistor Rc made of the same material as the sensing resistor Rs, is contained in the sensor probe 10 and connected in series with the resistor R1 so that it forms a part of the bridge arm opposite the arm containing the variable resistor Rv. Since the compensating resistor Rc is contained in the same probe as the sensing resistor Rs and has a similar temperature-resistance characteristic, the two resistances Rs and Rc always vary in direct proportion to each other.

Figure 2:
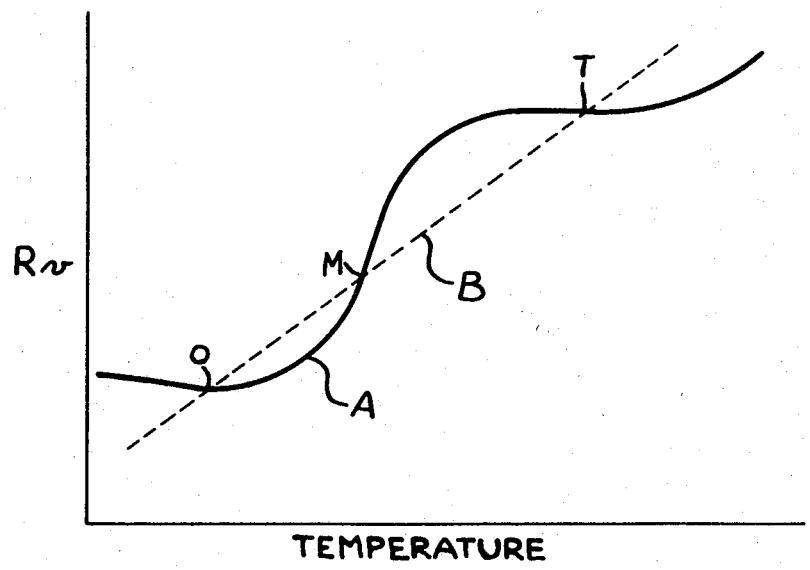
FIG. 2 is a graph showing the variations in the "nulling" adjustments of the variable resistance in the bridge circuit of FIG. 1 as a function of temperature.

One of the significant advantages of the present invention is that the values of the various resistors included in the bridge circuit can be readily optimized to minimize errors due to deviations from a perfect linear relationship between the nulling adjustments in Rv and the corresponding temperature changes. In this connection, it has been determined that the "nulling" value of the adjustable resistor Rv in the bridge arrangement of FIG. 1 varies with temperature according to the equation represented by the curve A shown in FIG. 2. Thus, it can be seen that there are minor deviations from the perfectly linear relationship represented by the broken line B in FIG. 2. With the present invention, it has been found that the deviations from perfect linearity can be minimized to such an extent that the linearity of the output characteristic is improved by two orders of magnitude. For example, using the same Rv value (3000 ohms) and temperature range ($-40°$ F. to $260°$ F.) mentioned previously, and assuming that point M in FIG. 3 is midway between points O and T, the fixed resistors can be calculated to have the values $R1 = 147.2631$ ohms, $R2 = 5878.3$ ohms, and $R3 = 6860.390$ ohms by the following equations (Rs being nickel wire):

At point O: $RsR2 = (Rc + R1)R3$

At point M: $K_1 RsR2 = (K_1 Rc + R1)\left(R3 + \frac{Rv}{M}\right)$ where $K1 = \frac{Rs_m}{Rs_0} = 1.33934$ $M = 2$ At point T: $K_2 Rs R2 = (K_2 Rc + R1)(R3 Rv)$ where $K2 = \frac{Rs_+}{Rs_0} = 1.75324$ $$R1 = Rc \left[\frac{(M-1)K_1 K_2 - MK_2 + K_1}{K_2 - 1 + M - MK_1}\right]$$

$$R_2 = \frac{(Rc + R_1) R_3}{Rs}$$

$$R_3 = Rv \left[\frac{K_2 - K1}{(M-1)K_1 K_2 - MK_2 + K_1}\right]$$

Using the above values, the resistance values in the bridge circuit of FIG. 1 at $30°$ F. temperature intervals over the range of $-40°$ F. to $260°$ F. are as follows:

| Temp. ° F. | Rs | R2 | Rc | Rc+R1 | Rs×R2 | R3+Rv | Increment | Error deviation, ° F. |
|---|---|---|---|---|---|---|---|---|
| -40 | 242.670 | 5,878.3 | 60.1661 | 407.9306 | 1,426,487.06 | 6,860.340 | | .000 |
| -10 | 257.889 | 5,878.3 | 64.4725 | 211.7356 | 1,515,948.91 | 7,159.631 | 299.291 | -.0709 |
| +20 | 273.696 | 5,878.3 | 68.4240 | 215.6877 | 1,608,867.20 | 7,459.264 | 299.633 | -.1076 |
| +50 | 290.124 | 5,878.3 | 72.5310 | 219.7941 | 1,705,435.91 | 7,759.243 | 299.979 | -.1097 |
| +80 | 307.200 | 5,878.3 | 76.8000 | 224.0631 | 1,805,813.76 | 8,059.398 | 300.155 | -.0942 |
| +110 | 325.020 | 5,878.3 | 83.2625 | 228.5256 | 1,910,560.66 | 8,360.379 | 300.981 | -.0039 |
| +140 | 343.560 | 5,878.3 | 85.8900 | 233.1531 | 2,019,548.75 | 8,661.899 | 301.520 | +.1559 |
| +170 | 362.850 | 5,878.3 | 90.7125 | 237.9756 | 2,132,941.16 | 8,962.857 | 300.958 | +.2517 |
| +200 | 382.920 | 5,878.3 | 95.7300 | 242.9931 | 2,250,918.64 | 9,263.302 | 300.445 | +.2962 |
| +230 | 403.770 | 5,878.3 | 100.9425 | 248.2051 | 2,373,481.99 | 9,562.580 | 299.278 | +.2240 |
| 260 | 425.460 | 5,878.3 | 106.3650 | 453.6281 | 2,500,981.52 | 9,860.082 | 297.502 | +.0458 |

As can be seen from the above table, the linearity of the temperature-resistance characteristic is improved by two orders of magnitude over the uncompensated bridge arrangement described previously.

The bridge circuit of FIG. 1 is, of course, designed for use with a temperature-sensing resistor made of a material such as nickel which has an upwardly sloping temperature-resistance characteristic, i.e., the resistance of the sensing resistor changes at an increasing rate with increasing temperature. Accordingly, the compensating resistor Rc in FIG. 1 is connected in series with the fixed resistor R1 in the bridge arm adjacent the temperature-sensing resistor $Rs$ and opposite the arm containing the variable resistor $Rv$ so that the cross product $(Rv+R3)$ $(Rc+R1)$ is varied automatically by the effect of $Rc$ in response to temperature changes to compensate for the nonlinear variations in the resistance of $Rs$.

Figure 3:
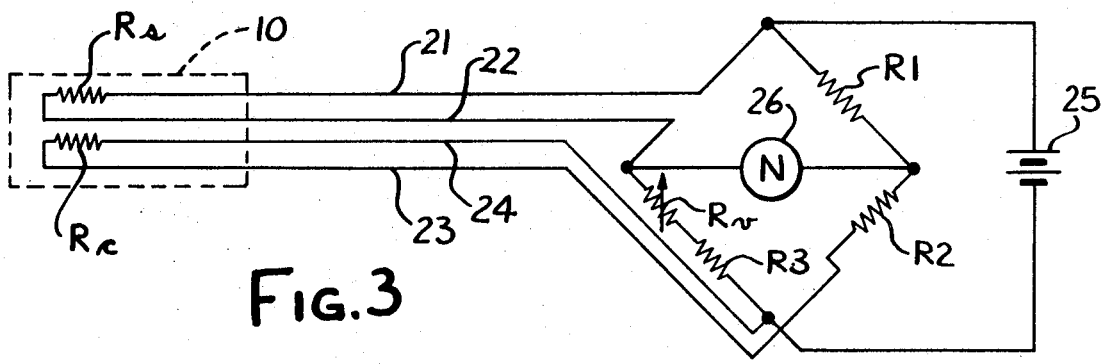
FIG. 3 is a schematic circuit diagram of a modified bridge circuit for use in an electrical thermometer embodying the invention and using a temperature-sensing element made of platinum.

In FIG. 3, there is illustrated a modified bridge circuit for use with a sensing resistor made of a material such as platinum which has a downwardly sloping characteristic, i.e., having a resistance which changes at a decreasing rate with increasing temperature. Thus, in FIG. 3 the compensating resistor $Rc$ is connected in series with the fixed resistor $R2$ in the bridge arm opposite the arm containing the temperature-sensing resistor $Rs$ so that the cross product $(R2+Rc)$ $(Rs)$ is varied automatically by the effect of $Rc$ in response to changing temperature to compensate for the non-linear variations in the resistance of $Rs$. In the circuit of FIG. 3, a D-C power source 25 is connected to the bridge, and the null condition of the bridge is detected by an electronic galvanometer 26.

In order to achieve an $Rv$-temperature characteristic which conforms as closely as possible to the ideal linear characteristic, it is preferred to determine the optimum values of the bridge resistances by computer techniques. For this purpose, the following equations may be derived from the bridge arrangement shown in FIG. 3:

(1) $Rv+R3=\dfrac{Rs}{R_1}(Rc+R2)$ (2) $Rs=Rs_o f(t) \quad Rc=Rc_o f(t)$ (3) $Rv+R3=\dfrac{Rs_o}{R1}[Rc_o f(t)^2+R2f(t)]$ (4) $Rv+R3=\dfrac{Rs_o}{R1}[A+BT+Rc_o f(t)^2$
$+R2f(t)-A-BT]$ (5) Let: $Rv+R3=\dfrac{Rs_o}{R1}(A+BT)$ (6) Then error (ohms) $=\dfrac{Rs_o}{R1}[Rc_o f(t)^2$
$+R2f(t)-A-BT]$ (7) Error $(°|C.) = K_1 f(t)^2 + K_2 f(t)$
$- K_3 - T$ where $K_1=\dfrac{Rc_o}{B}$, $K_2=\dfrac{R2}{B}$, $K_3=\dfrac{A}{B}$ (8) Let $L=\dfrac{R2}{Rc_o}$ (9) Error $(°|C.) = K_1[f(t)^2+Lf(t)] - K_3 - T$

(10) From above: $R_3=\dfrac{Rs_o A}{R_1} \quad R_3=K_3 S$

(11) $S=\dfrac{Rs_o}{R_1} \cdot B = \dfrac{4Rv}{4T}$

Using the above equations, a computer can be used to determine a value of $L$ to minimize $$\dfrac{d}{dt}\Big[K_1[f(t)^2+Lf(t)]\Big]$$

and then determine the values of $K_3$ and $K_1$ to minimize the temperature-measuring errors due to deviations from linearity. Thus, in one example of the invention the above equations were used to determine the following parameter values and temperature measurements over the range of $-40°$ C. to $+260°$ C. (Algebraic fitting, using equations similar to those described previously, was used to determine values of $R_2 = 2249.83879$, $R_3 = 2006.60419$, and $R_1 = 9766.04232$.):

| Temperature: | Rs and Rc | Rc+R2 | (Rc+R2) Rs | Rv+R3 | Indicated Temp.° C. | Error using algebraic fitting, degrees C. | Error using computerized fitting, degrees C. |
|---|---|---|---|---|---|---|---|
| −40 | 83.96830 | 2,333.807098 | 195,965.814547 | 2,006.60419 | −40.000 | 0.0000 | +.04348 |
| −25 | 90.003719 | 2,339.842517 | 210,594.528404 | 2,156.39582 | −24.9792 | −0.0208 | +.01536 |
| −10 | 96.010559 | 2,345.849357 | 225,226.308095 | 2,306.21884 | −9.9615 | −0.0385 | −.00911 |
| +5 | 101.99031 | 2,351.829108 | 239,863.779792 | 2,456.10014 | +4.9496 | −0.0504 | −.02725 |
| +20 | 107.94366 | 2,357.782468 | 254,507.668000 | 2,606.04715 | +19.9443 | −0.0557 | −.03830 |
| +35 | 113.87068 | 2,363.709478 | 269,157.205582 | 2,756.05200 | +34.9448 | −0.0552 | −.04309 |
| +50 | 119.77135 | 2,369.610148 | 283,811.406400 | 2,906.10461 | 49.9500 | −0.0500 | −.04261 |
| +65 | 125.64568 | 2,375.484478 | 298,469.362568 | 3,056.19567 | 64.9591 | −0.0408 | −.03781 |
| +80 | 131.49366 | 2,381.332458 | 313,130.120579 | 3,206.31547 | 79.9711 | −0.0289 | −.02964 |
| +95 | 137.31531 | 2,387.154108 | 327,792.806358 | 3,356.45490 | 94.9851 | −0.0149 | −.01907 |
| +110 | 143.11061 | 2,392.949408 | 342,456.449478 | 3,506.60419 | +110.0000 | −0.0000 | −.00703 |
| +125 | 148.87956 | 2,398.718358 | 357,120.133703 | 3,656.75390 | 125.0150 | +0.0150 | +.00552 |
| +140 | 154.62218 | 2,404.460978 | 371,782.998143 | 3,806.89521 | 140.0291 | +0.0291 | +.01766 |
| +155 | 160.33845 | 2,410.177248 | 386,444.084170 | 3,957.01882 | 155.0414 | +0.0414 | +.02843 |
| +170 | 166.02838 | 2,415.867178 | 401,102.513859 | 4,107.11423 | 170.0510 | +0.0510 | +.03692 |
| +185 | 171.69197 | 2,421.530768 | 415,757.387974 | 4,257.17373 | 185.0570 | +0.0570 | +.04219 |
| +200 | 177.32921 | 2,427.168008 | 430,407.785396 | 4,407.18738 | 200.0583 | +0.0583 | +.04333 |
| +215 | 182.94011 | 2,432.778908 | 445,052.841035 | 4,557.14634 | 215.0542 | +0.0542 | +.03940 |
| +230 | 188.52467 | 2,438.363468 | 459,691.668145 | 4,707.04153 | 230.0437 | +0.0437 | +.02951 |
| +245 | 194.08289 | 2,443.921688 | 474,323.384141 | 4,856.86390 | 245.0260 | +0.0260 | +.01274 |
| +260 | 199.61476 | 2,449.453558 | 488,947.084111 | 5,006.60419 | +260.0000 | 0.0000 | −.01182 |

It should be noted that computerized fitting provides a slightly better fit than algebraic fitting.

As can be seen from the foregoing data, this invention provides an improved resistance bridge-type thermometer which produces a substantially linear output over a relatively wide temperature range, and yet the circuit is extremely economical. The improved bridge arrangement provided by the invention facilitates optimization of the bridge parameters to minimize the deviations from ideal linearity and thereby provide precise temperature measurements. Moreover, the resistance bridge-type thermometer of the invention is highly accurate and reliable over long operating periods, and it is readily adaptable to control applications as well as temperature-sensing applications.

I claim as my invention:

1. A resistance bridge-type electrical thermometer comprising a resistance bridge having three arms with fixed resistors therein and a fourth arm including a temperature-sensing resistor having a non-linear temperature-resistance characteristic, said temperature-sensing resistor being made of a material having a resistance which changes at an increasing rate with increasing temperature, at least one linear variable resistor connected in one of the bridge arms adjacent to the arm containing said temperature resistor for making null adjustments in said bridge, a sensor probe containing said temperature-sensing resistor, a compensating resistor also contained in said sensor probe and having a nonlinear temperature resistance characteristic similar to that of said temperature-sensing resistor, said compensating resistor being connected in series with the fixed resistor in the bridge arm opposite the arm containing said variable linear resistor and adjacent the arm containing said temperature-sensing resistor, to compensate for the nonlinear temperature characteristic of said temperature-sensing resistor so that the slope of the null adjustment change of said bridge for a given temperature change remains substantially constant over a preselected temperature range.

2. A resistance bridge-type electrical thermometer as set forth in claim 1 wherein said bridge includes a null detector.

3. A resistance bridge-type electrical thermometer as set forth in claim 2 wherein the power source for said bridge is a source of A-C power and said null detector is a synchronous demodulator.

4. A resistance bridge-type electrical thermometer as set forth in claim 2 wherein the power source for said bridge is a source of D-C power and said null detector is an electronic galvanometer.

5. A resistance bridge-type electrical thermometer as set forth in claim 1 wherein said temperature-sensing resistor and said compensating resistor are made of the same material.

6. An electrical thermometer comprising the combination of temperature-sensing means for producing a first nonlinear electrical characteristic representing the sensed temperature, compensating means including second temperature-sensing means for producing a second nonlinear electrical characteristic representing the sensed temperature, with the ratio of said first characteristic to said second characteristic being a constant, and output means responsive to said first and second sensing means for producing a linear electrical output characteristic representing said sensed temperature, said output means including means for multiplying or dividing said first characteristic by said second characteristic to produce said linear electrical output characteristic.

7. An electrical instrument for producing a linear electrical characteristic representing a variable condition such as temperature or the like, said instrument comprising the combination of first sensing means responsive to the variable condition for producing a first nonlinear electrical characteristic representing the variable condition, second sensing means responsive to the variable condition for producing a second nonlinear electrical characteristic representing the variable condition with the ratio of said first characteristic to said second characteristic being a constant, and output means responsive to said first and second sensing means for producing a linear electrical output characteristic representing said variable condition, said output means including means for multiplying or dividing said first characteristic by said second characteristic to produce said linear electrical output characteristic.

8. A resistance bridge-type electrical thermometer comprising a resistance bridge having three arms with fixed resistors therein and a fourth arm including a temperature-sensing resistor having a nonlinear temperature-resistance characteristic, said temperature-sensing resistor being made of a material having a resistance which changes at a decreasing rate with increasing temperature, at least one linear variable resistor connected in one of the bridge arms adjacent to the arm containing said temperature-sensing resistor for making null adjustments in said bridge, a sensor probe containing said temperature-sensing resistor, a compensating resistor also contained in said sensor probe and having a nonlinear temperature-resistance characteristic similar to that of said temperature-sensing resistor, said compensating resistor being connected in series with the fixed resistor in the bridge arm opposite the arm containing said temperature-sensing resistor and adjacent the arm containing said variable linear resistor to compensate for the nonlinear temperature-resistance characteristic of said temperature-sensing resistor so that the slope of the null adjustment change of said bridge for a given temperature change remains substantially constant over a preselected temperature range.

9. A resistance bridge-type electrical thermometer as set forth in claim 8 wherein said bridge includes a null detector.

10. A resistance bridge-type electrical thermometer as set forth in claim 9 wherein the power source for said bridge is a source of A-C power and said null detector is a synchronous demodulator.

11. A resistance bridge-type electrical thermometer as set forth in claim 9 wherein the power source for said bridge is a source of D-C power and said null detector is an electronic galvanometer.

12. A resistance bridge-type electrical thermometer as set forth in claim 8 wherein said temperature-sensing resistor and said compensating resistor are made of the same material.

References Cited
UNITED STATES PATENTS

| | | | |
|---|---|---|---|
| 2,764,731 | 9/1956 | Koerner | 323—69 |
| 2,891,218 | 6/1959 | Werts. | |
| 3,052,124 | 9/1962 | Averitt. | |
| 3,067,613 | 12/1962 | Rasmussen et al. | |

LOUIS R. PRINCE, Primary Examiner

F. SHOON, Assistant Examiner

U.S. Cl. X.R.

323—75